US008697802B2

(12) United States Patent
Scates

(10) Patent No.: US 8,697,802 B2
(45) Date of Patent: Apr. 15, 2014

(54) PROCESS FOR PRODUCING POLYVINYL ALCOHOL OR A COPOLYMER THEREOF

(75) Inventor: Mark O. Scates, Houston, TX (US)

(73) Assignee: Celanese International Corporation, Dallas, TX (US)

( * ) Notice: Subject to any disclaimer, the term of this patent is extended or adjusted under 35 U.S.C. 154(b) by 60 days.

(21) Appl. No.: 13/305,203

(22) Filed: Nov. 28, 2011

(65) Prior Publication Data

US 2013/0137820 A1 May 30, 2013

(51) Int. Cl.
*C08F 8/00* (2006.01)

(52) U.S. Cl.
USPC ............... 525/62; 525/56; 526/75; 526/330; 526/331; 528/483; 528/490; 528/501

(58) Field of Classification Search
USPC ......... 525/56, 62; 526/75, 330, 331; 528/483, 528/490, 501
See application file for complete search history.

(56) References Cited

U.S. PATENT DOCUMENTS

| 2,882,244 | A | 4/1959 | Milton |
| 3,130,007 | A | 4/1964 | Breck |
| 3,268,299 | A | 8/1966 | Russell |
| 4,134,926 | A | 1/1979 | Tsao et al. |
| 4,234,718 | A | 11/1980 | Brown |
| 4,234,719 | A | 11/1980 | Wan |
| 4,352,940 | A | 10/1982 | Adelman et al. |
| 4,463,138 | A | 7/1984 | Wu et al. |
| 4,497,967 | A | 2/1985 | Wan |
| 4,544,511 | A | 10/1985 | Isshiki et al. |
| 4,727,214 | A | 2/1988 | Uytterhoeven et al. |
| 4,820,767 | A | 4/1989 | Wu |
| 5,185,308 | A | 2/1993 | Bartley et al. |
| 5,198,592 | A | 3/1993 | van Beijnum et al. |
| 5,206,434 | A | 4/1993 | Scates et al. |
| 5,414,161 | A | 5/1995 | Uhm et al. |
| 5,691,267 | A | 11/1997 | Nicolau et al. |
| 5,770,671 | A | 6/1998 | Nefzger et al. |
| 6,114,571 | A | 9/2000 | Abel et al. |
| 6,232,352 | B1 | 5/2001 | Vidalin et al. |
| 6,603,038 | B1 | 8/2003 | Hagemeyer et al. |
| 6,657,078 | B2 | 12/2003 | Scates et al. |
| 6,852,877 | B1 | 2/2005 | Zeyss et al. |
| 7,005,541 | B2 | 2/2006 | Cheung et al. |
| 7,115,772 | B2 | 10/2006 | Picard et al. |
| 7,208,624 | B2 | 4/2007 | Scates et al. |
| 7,399,892 | B2 | 7/2008 | Rix et al. |
| 7,468,455 | B2 | 12/2008 | Mazanec |
| 7,855,303 | B2 | 12/2010 | Johnston et al. |
| 7,906,680 | B2 | 3/2011 | Scates et al. |
| 7,947,746 | B2 | 5/2011 | Daniel et al. |
| 2003/0135070 | A1 | 7/2003 | Picard et al. |
| 2007/0191625 | A1 | 8/2007 | Scates et al. |
| 2007/0197822 | A1 | 8/2007 | Picard et al. |
| 2008/0221352 | A1 | 9/2008 | Scates et al. |
| 2008/0234512 | A1 | 9/2008 | Picard et al. |
| 2009/0281363 | A1* | 11/2009 | Wu et al. ........................ 585/640 |
| 2009/0326080 | A1 | 12/2009 | Chornet et al. |
| 2010/0030001 | A1 | 2/2010 | Chen et al. |
| 2010/0030002 | A1 | 2/2010 | Johnston et al. |
| 2010/0204512 | A1 | 8/2010 | Kimmich et al. |
| 2011/0004033 | A1 | 1/2011 | Johnston et al. |
| 2013/0137819 | A1 | 5/2013 | Scates |
| 2013/0137903 | A1 | 5/2013 | Scates |
| 2013/0137904 | A1 | 5/2013 | Scates |
| 2013/0137905 | A1 | 5/2013 | Scates |

FOREIGN PATENT DOCUMENTS

| EP | 0087870 | 2/1983 |
| EP | 0108437 | 10/1983 |
| EP | 0104197 | 4/1984 |
| EP | 2060553 | 5/2009 |
| EP | 2060555 A1 * | 5/2009 |
| GB | 1559540 | 1/1980 |
| WO | WO 82/03854 | 11/1982 |
| WO | WO 83/03409 | 10/1983 |
| WO | WO 99/08791 | 2/1999 |

OTHER PUBLICATIONS

Bann, W.; Chemical Business Focus, Aug. 4, 2010, p. 1-34.*
Erbil, H.Y., Vinyl Acetate Emulsion Polymerization and Copolymerization with Acrylic Monomers, 2000, p. 127-129.*
Salyer, I.O., et al.; Journal of Polymer Science: Part A-1, 1971, p. 3083-3103.*
Yang, et al., "Process of Ethanol Synthesis through Esterification of Acetic Acid and Economic Analysis", No. 4, 2011.
W.S. Park, et al., Journal of Polymer Science, Polymer Physics Ed., vol. 15, p. 81 (1977).
K. Noro, "Polyvinyl Alcohol by Acetate", 1976, pp. 303-307 and "6 Polyvinyl Alcohol", pp. 95-130.

* cited by examiner

Primary Examiner — Robert Jones, Jr.

(57) ABSTRACT

Acetic acid is converted to vinyl acetate monomer by a reaction with oxygen and ethylene. The vinyl acetate is polymerized to form a vinyl acetate polymer or copolymer, which is then reacted in a methanolysis reaction with methanol and base to form a polymer or copolymer of vinyl alcohol and a methyl acetate byproduct. Ethanol is produced from methyl acetate by a hydrogenolysis reaction. The hydrogenolysis reaction also produces methanol. At least a portion of this ethanol is converted to ethylene by a dehydration reaction. At least a portion of the ethylene produced in this dehydration reaction is recycled to react with acetic acid and oxygen to form vinyl acetate. By converting a byproduct and by recycle of compositions, a polymer or copolymer of vinyl alcohol is efficiently produced with minimal waste.

19 Claims, 1 Drawing Sheet

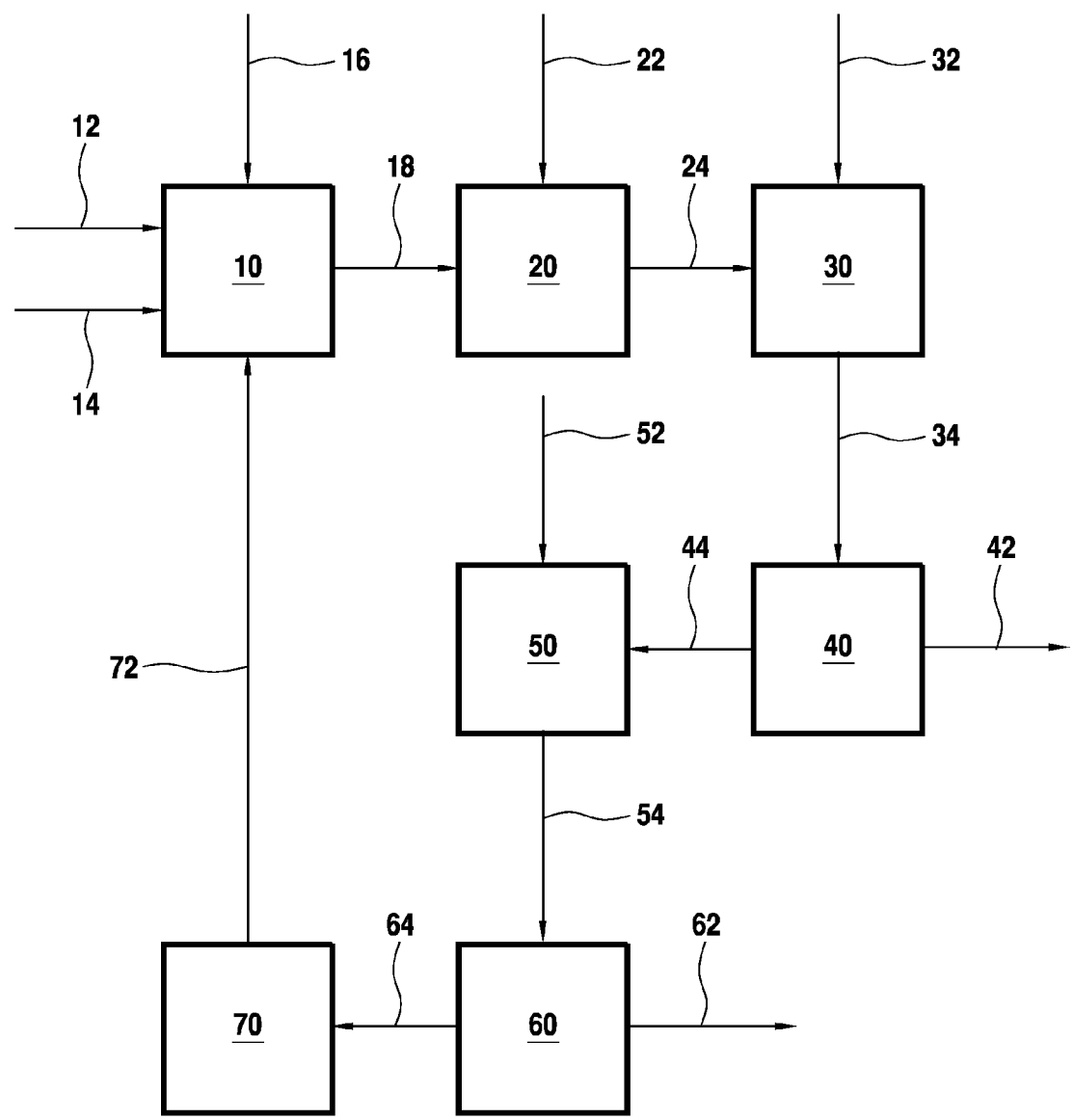

PROCESS FOR PRODUCING POLYVINYL ALCOHOL OR A COPOLYMER THEREOF

FIELD OF THE INVENTION

The present invention relates generally to processes for producing poly vinyl alcohol or a copolymer thereof and, in particular, to a process for making a polyvinyl alcohol polymer or copolymer, while converting byproducts and recycling converted byproducts along with unconverted reactants.

BACKGROUND OF THE INVENTION

Poly(vinyl alcohol) is useful for many purposes. For example, poly(vinyl alcohol) of especially high viscosity is used as thickening agent, protective colloid and the like in which high viscosity solutions having low solid content are desired. Moreover, poly(vinyl alcohol) is used in textile and paper sizing, in adhesives, as an emulsion polymerization aid, and as an intermediate in the production of poly(vinyl butyral), the adhesive interlayer in laminated safety glass. Furthermore, poly(vinyl alcohol) is used for textile fiber after water-insolubilization.

High molecular weight poly(vinyl alcohol) is a high-melting, high-strength material which is suitable for a wide variety of applications including tire cord, housing materials, automotive plastics, super strength fibers, and the like. The excellent adhesive properties of poly(vinyl alcohol) render it potentially an outstanding tire cord material.

Poly(vinyl alcohol) is conventionally produced in a two-step process. In the first step of the process, vinyl acetate is polymerized to produce poly(vinyl acetate). In the second step, the poly(vinyl acetate) is subjected to alcoholysis (methanolysis or ethanolysis) in order to convert the poly (vinyl acetate) to poly(vinyl alcohol).

In the production of poly(vinyl alcohol), byproducts and unconverted reactants are produced. The need remains for using and recycling these byproducts and unconverted reactants.

SUMMARY OF THE INVENTION

The present invention relates to processes for making a polymer or copolymer of vinyl alcohol. Acetic acid is reacted with ethylene in the presence of oxygen under conditions sufficient to form vinyl acetate. The vinyl acetate, optionally in the presence of a comonomer, such as ethylene, is polymerized to form a vinyl acetate based polymer or copolymer. The vinyl acetate based polymer or copolymer is contacted with a base and methanol under conditions effective to form a polymer or copolymer of vinyl alcohol and a first stream comprising methyl acetate. At least a portion of the methyl acetate coproduced with the vinyl alcohol polymer or copolymer is reacted with hydrogen to form methanol and ethanol. This reaction of methyl acetate with hydrogen to form methanol and ethanol is referred to herein as a hydrogenolysis reaction. At least a portion of the ethanol, which is coproduced with methanol in the hydrogenolysis reaction, is dehydrated to form ethylene. At least a portion of the ethylene is recycled to the reaction of acetic acid with ethylene and oxygen to form vinyl acetate monomer.

Thus, in one embodiment, the invention is to a process for producing a polymer or copolymer of vinyl alcohol, the process comprising the steps of: (a) contacting acetic acid with ethylene and oxygen under conditions sufficient to form vinyl acetate monomer; (b) polymerizing at least a portion of the vinyl acetate monomer from step (a) to form a vinyl acetate based polymer or copolymer; (c) contacting at least a portion of the vinyl acetate based polymer or copolymer from step (b) with a base and methanol under conditions effective to form a polymer or copolymer of vinyl alcohol and a first stream comprising methyl acetate; (d) subjecting at least a portion of the methyl acetate to hydrogenolysis to form methanol and ethanol; (e) dehydrating at least a portion of the ethanol formed in step (d) to form ethylene; and (f) recycling at least a portion of the ethylene formed in step (e) to step (a) for contact with acetic acid and oxygen. In an optional step, a portion of the methanol produced in step (d) may be recycled to the contacting step (c) for methanolysis of the vinyl acetate polymer or copolymer. In another optional step, a portion of the ethylene produced in the dehydration of step (e) may be recycled to polymerization step (b) to produce an ethylene vinyl acetate copolymer.

Examples of the vinyl acetate based polymer or copolymer used in step (c) include polyvinyl acetate (PVAc) and an alkene vinyl acetate copolymer, such as ethylene vinyl acetate (EVAc). Examples of the vinyl alcohol polymer or copolymer formed in step (c) include polyvinyl alcohol (PVOH) and an alkene vinyl alcohol copolymer, such as ethylene vinyl alcohol (EVOH). For example, in step (c), polyvinyl acetate may be converted to polyvinyl alcohol, and an alkene vinyl acetate copolymer may be converted into an alkene vinyl alcohol copolymer.

The vinyl acetate polymer or copolymer may be formed by polymerizing vinyl acetate monomer, optionally in the presence of a comonomer, such as an alkene, e.g., ethylene. The vinyl acetate monomer may be formed through the acetoxylation of ethylene.

The first stream comprising methyl acetate from step (c) may be purified to remove at least some impurities, which may be detrimental to the hydrogenolysis reaction. This purification may take place by a variety of techniques, including extractive distillation, liquid/liquid extraction, distillation, crystallization, gas stripping, a membrane separation technique, filtration, flash vaporization, chemical reaction of one or more impurities, and combinations of these techniques. Thus, the process may further comprise the step of purifying the first stream comprising methyl acetate from step (c) to form a second stream comprising methyl acetate. The purifying step may remove sufficient impurities from the first stream such that the second stream is a more suitable feed to a hydrogenolysis process to produce methanol and ethanol.

The first stream comprising methyl acetate and impurities from step (c) may comprise methyl acetate and impurities, such as methanol, light organics, water, vinyl acetate monomer, acetaldehyde, dimethylacetyl, sodium acetate, and polymer solids. The second stream obtained by purifying the second stream may comprise methyl acetate and impurities, such as methanol and water.

The purified second stream may comprise methanol in a wide range of quantities, depending upon a number of factors, including the manner in which PVOH is made and the manner in which methyl acetate is recovered and purified. A particular source of methanol in admixture with methyl acetate is from excess methanol used in a methanolysis reaction with polyvinyl acetate. The second stream may comprise, for example, from 5 wt % to 95 wt %, for example, from 60 wt % to 95 wt %, for example, from 70 wt % to 90 wt %, methyl acetate and from 5 wt % to 95 wt %, for example, from 5 wt % to 40 wt %, for example, from 10 wt % to 30 wt %, methanol, based on the total weight of methyl acetate and methanol in the second stream.

The purified second stream may also comprise water in a wide range of quantities, depending upon a number of factors, including the manner in which methyl acetate is recovered and purified. However, it is preferred that the second stream contains no more than a small amount of water, so that the ethanol recovered from the subsequent hydrogenolysis also contains a small amount of water. For example, the second stream may comprise from 90 wt % to 100 wt %, for example, from 93 wt % to 100 wt %, for example, from 95 wt % to 100 wt %, methyl acetate and from 0 wt % to 10 wt %, for example, from 0 wt % to 7 wt %, for example, from 0 wt % to 5 wt %, for example, from 0 wt % to 5 wt %, water, based on the total weight of methyl acetate and water in the second stream.

The hydrogenolysis reaction may take place in the presence of a suitable hydrogenolysis catalyst. Examples of hydrogenolysis catalysts include copper containing catalysts, especially those with copper in a reduced or partially reduced state. Examples of such copper containing catalysts are described in U.S. Pat. No. 5,198,592, U.S. Pat. No. 5,414,161, U.S. Pat. No. 7,947,746, U.S. Patent Application Publication No. US 2009/0326080, and WO 83/03409, the entireties of which are incorporated herein by reference.

After methanol and ethanol are produced by hydrogenolysis, the methanol and ethanol may be separated by a suitable separation technique, such as distillation, to form an ethanol stream and a methanol stream. The ethanol stream may comprise at least 90 wt. % ethanol, for example, at least 92 wt. % ethanol, for example, at least 95 wt. % ethanol. The methanol stream may comprise at least 90 wt. % methanol, for example, at least 92 wt. % methanol, for example, at least 95 wt. % methanol.

At least a portion of the methanol stream may be reacted with carbon monoxide to produce acetic acid, which is, in turn, recycled to the step (a) reaction of acetic acid with ethylene and oxygen to form vinyl acetate monomer. Optionally, a portion of the methanol stream may be recycled to step (c) for contact with a vinyl acetate based polymer or copolymer.

In another embodiment, the invention is to a process for producing a polymer or copolymer of vinyl alcohol hydrogenolysis of methyl acetate derived from a vinyl alcohol polymer or copolymer production facility to form ethanol, wherein the hydrogenolysis of methyl acetate further produces methanol, and wherein at least a portion of the ethanol produced by hydrogenolysis of methyl acetate is converted to ethylene, which is recycled to the vinyl alcohol polymer or copolymer production facility wherein ethylene is reacted with oxygen and acetic acid to form vinyl acetate monomer, vinyl acetate monomer is polymerized to form a polymer or polymer or copolymer of vinyl acetate, and the polymer or copolymer of vinyl acetate is reacted with methanol and base to form a polymer or copolymer of vinyl alcohol and methyl acetate.

BRIEF DESCRIPTION OF THE DRAWING

FIG. 1 is a representation of an integrated process for producing polyvinyl alcohol or a copolymer thereof.

DETAILED DESCRIPTION OF THE INVENTION

A. Introduction

Polyvinyl alcohol is commercially produced by the reaction of vinyl acetate with a radical initiator to produce polyvinyl acetate. Polyvinyl acetate may then be reacted with methanol in the presence of a base under conditions sufficient to produce polyvinyl alcohol (PVOH) and methyl acetate. Copolymers of polyvinyl alcohol such as ethylene/vinyl alcohol copolymers (EVOH) may be similarly formed by reacting an ethylene/vinyl acetate copolymer with methanol in the presence of a base under conditions sufficient to form the EVOH and methyl acetate. Thus, in both reactions, methyl acetate is produced as a byproduct. According to the present invention, methyl acetate formed in the production of PVOH or EVOH may be subjected to hydrogenolysis in the presence of a catalyst to form methanol and ethanol. A portion of the ethanol is dehydrated to form acetic acid, which is in turn converted to vinyl acetate by a reaction with ethylene and oxygen. The vinyl acetate is then polymerized, and the polymerized vinyl acetate is reacted with methanol and base to form polyvinyl alcohol polymer or copolymer and methyl acetate.

FIG. 1 provides a flow diagram of an example of an integrated process for producing polyvinyl alcohol or a copolymer thereof. It will be understood that lines depicted in FIG. 1, such as lines 12, 14 and 18, depict flow of materials through the process, rather than specific apparatus or equipment, such as pipes. Similarly, boxes, such as 10, 20 and 30, depict zones rather than any particular apparatus or equipment.

In FIG. 1, a feed comprising acetic acid passes via line 12 to vinyl acetate formation zone 10. Ethylene is also fed to zone 10 via line 14. Once ethylene is produced, as described below, ethylene may also be introduced into vinyl acetate formation zone through line 72 as the sole or partial source of ethylene feed to vinyl acetate formation zone 10. Oxygen is fed to zone 10 via line 16. A vinyl acetate product stream exits zone 10 via line 18.

Vinyl acetate (i.e. vinyl acetate monomer) is introduced into polymerization zone 20 via line 18. Optionally, a comonomer, such as ethylene, may be introduced into polymerization zone 20 through line 22. Catalyst(s), diluents, and whatever else is desirable for polymerization may also be introduced into polymerization zone 20 through lines 18, 22 or lines not shown in FIG. 1. A polymerized product stream is recovered from polymerization zone 20 through line 24.

The polymerized product stream in line 24 comprises a polyvinyl acetate polymer or copolymer. Product in line 24 is introduced to alcoholysis reaction zone 30. Another feed comprising methanol is also introduced into the alcoholysis reaction zone 30 through line 32. The feed in line 32 may also include a suitable base, such as anhydrous sodium oxide, for the alcoholysis reaction as described below. Optionally, the polyvinyl acetate or an ethylene/vinyl acetate copolymer, methanol, and base may be premixed before being introduced into the alcoholysis reaction zone 30. A suitable catalyst may also be introduced into the alcoholysis reaction zone 30, for example, along with the methanol feed in line 32 or through a line not shown in FIG. 1.

Line 34 represents the transfer of alcoholysis reaction product to product recovery zone 40. A product comprising polyvinyl alcohol or ethylene/vinyl alcohol copolymer is recovered via line 42, and a methyl acetate stream is removed from product recovery zone 40 via line 44. Methyl acetate in line 44 is introduced into hydrogenolysis zone 50. Also, a feed comprising hydrogen is introduced into hydrogenolysis zone 50 via line 52. The product stream 54 passes from the hydrogenolysis zone 50 to separation zone 60. An ethanol product stream 64 removes ethanol product from separation zone 60, and a methanol product stream 62 removes methanol product from separation zone 60. Optionally, a portion of the methanol product stream 62 is recycled to the alcoholysis zone 50 by lines not shown in FIG. 1.

At least a portion of the ethanol product stream 64 is passed into dehydration zone 70 to produce ethylene. The ethylene product is recovered from zone 70 and at least a portion thereof is recycled to vinyl acetate formation zone 10 via line 72. Optionally, a portion of the ethylene product recovered from dehydration zone 70 may be introduced into polymerization zone 20 via a line not shown in FIG. 1 to produce an ethylene/vinyl acetate copolymer.

B. Production of Vinyl Alcohol

Vinyl acetate, which is also referred to in the art as vinyl acetate monomer (VAM), may be prepared by contacting acetic acid with reactants under conditions effective to form vinyl acetate. In one embodiment, acetic acid is reacted with ethylene and oxygen to form vinyl acetate. Examples of such reactions are described in U.S. Pat. No. 7,855,303 and in U.S. Pat. No. 7,468,455, the entireties of which are incorporated herein by reference.

Any of the known catalysts for oxidative reaction of ethylene with acetic acid to form VAM can be employed, for example, as described in GB 1 559 540, U.S. Pat. Nos. 5,185,308; 5,691,267; 6,114,571; and WO 99/08791 the equivalent to U.S. Pat. No. 6,603,038. EP-A 0 330 853 describes impregnated catalysts for the production of VAM containing palladium, potassium, manganese and cadmium as additional promoter instead of gold. See also, U.S. Pat. No. 6,852,877. All of the references mentioned immediately above are incorporated herein by reference in their entirety as relating to forming VAM from ethylene, acetic acid and oxygen.

GB 1 559 540 describes suitable catalysts that can be employed in the preparation of VAM by the reaction of ethylene, acetic acid and oxygen. The catalyst maybe comprised of: (1) a catalyst support having a particle diameter of from 3 to 7 mm and a pore volume of from about 0.2 to 1.5 ml/g, a 10% by weight water suspension of the catalyst support having a pH from about 3.0 to 9.0, (2) a palladium-gold alloy distributed in a surface layer of the catalyst support, the surface layer extending less than 0.5 mm from the surface of the support, the palladium in the alloy being present in an amount of from about 1.5 to 5.0 grams per liter of catalyst, and the gold being present in an amount of from about 0.5 to 2.25 grams per liter of catalyst, and (3) from 5 to 60 grams per liter of catalyst of alkali metal acetate.

U.S. Pat. No. 5,185,308 to Bartley et al. describes a shell impregnated catalyst active for the production of VAM from ethylene, acetic acid and an oxygen containing gas, the catalyst consisting essentially of (1) a catalyst support having a particle diameter from about 3 to about 7 mm and a pore volume of 0.2 to 1.5 ml per gram, (2) palladium and gold distributed in the outermost 1.0 mm thick layer of the catalyst support particles, and (3) from about 3.5 to about 9.5% by weight of potassium acetate wherein the gold to palladium weight ratio in said catalyst is in the range 0.6 to 1.25.

U.S. Pat. No. 5,691,267 to Nicolau et al. describes a two step gold addition method for a catalyst used in the gas phase formation of VAM from the reaction of ethylene, oxygen, and acetic acid. The catalyst is formed by (1) impregnating a catalyst carrier with aqueous solutions of a water-soluble palladium salt and a first amount of a water-soluble gold compound such as sodium-palladium chloride and auric chloride, (2) fixing the precious metals on the carrier by precipitating the water-insoluble palladium and gold compounds by treatment of the impregnated carriers with a reactive basic solution such as aqueous sodium hydroxide which reacts with the palladium and gold compounds to form hydroxides of palladium and gold on the carrier surface, (3) washing with water to remove the chloride ion (or other anion), and (4) reducing all the precious metal hydroxides to free palladium and gold, wherein the improvement comprises (5) impregnating the carrier with a second amount of a water-soluble gold compound subsequent to fixing a first amount of water-soluble gold agent, and (6) fixing the second amount of a water-soluble gold compound.

U.S. Pat. No. 6,114,571 to Abel et al. describes a catalyst for forming vinyl acetate in the gas phase from ethylene, acetic acid, and oxygen or oxygen-containing gases wherein the catalyst is comprised of palladium, gold, boron, and alkali metal compounds on a support. The catalyst is prepared by a) impregnating the support with soluble palladium and gold compounds; b) converting the soluble palladium and gold compounds on the support into insoluble compounds by means of an alkaline solution; c) reducing the insoluble palladium and gold compounds on the support by means of a reducing agent in the liquid phase; d) washing and subsequently drying the support; e) impregnating the support with a soluble alkali metal compound; and f) finally drying the support at a maximum of 1500° C., wherein boron or boron compounds are applied to the catalyst prior to the final drying.

WO 99/08791, the equivalent to U.S. Pat. No. 6,603,038 to Hagemeyer et al., describes a method for producing catalysts containing metal nanoparticles on a porous support, especially for gas phase oxidation of ethylene and acetic acid to form VAM. The invention relates to a method for producing a catalyst containing one or several metals from the group of metals comprising the sub-groups Ib and VIIb of the periodic table on porous support particles, characterized by a first step in which one or several precursors from the group of compounds of metals from sub-groups Ib and VIIb of the periodic table is or are applied to a porous support, and a second step in which the porous, preferably nanoporous support to which at least one precursor has been applied is treated with at least one reduction agent, to obtain the metal nanoparticles produced in situ in the pores of said support.

VAM formation may be carried out heterogeneously with the reactants being present in the gas phase.

The molecular oxygen-containing gas used in formation of VAM may comprise other inert gases such as nitrogen. The source of molecular oxygen used in forming VAM may be air.

The reaction to produce VAM may be carried out at a temperature in the range of from about 140° C. to 220° C. The reaction to produce VAM may be carried out at a pressure in the range of from about 1 to 100 atmospheres absolute. The reaction to produce VAM may be carried out in any suitable reactor design capable of removing the heat of reaction in an appropriate way; preferred technical solutions are fixed or fluidized bed reactors as described herein.

Acetic acid conversions in the range of about 5 to 50% may be achieved in the reaction to produce VAM. Oxygen conversions in the range of about 20 to 100% may be achieved. The catalyst suitably has a productivity (space time yield, STY) in the range of about 100 to 2000 grams of vinyl acetate per hour per liter of catalyst, but >10000 grams of vinyl acetate per hour per liter of catalyst is also suitable.

As already noted above, the gaseous product stream from the reaction to produce VAM comprises VAM and water and optionally also unreacted acetic acid, ethylene, ethyl acetate, ethane, nitrogen, carbon monoxide, carbon dioxide and possibly traces of other byproducts. It is preferred to remove ethylene, and ethane, carbon monoxide and carbon dioxide, if any, from the product stream, suitably as an overhead gaseous fraction from a scrubbing column, in which a liquid fraction comprising vinyl acetate, water and acetic acid is removed from the base.

The product stream comprising VAM, water and acetic acid, with or without the intermediate scrubbing step, may be separated in the final step by distillation into an overhead azeotrope fraction comprising vinyl acetate and water and a base fraction comprising acetic acid.

VAM is recovered from the azeotrope fraction, for example, by decantation. The recovered VAM may, if desired, be further purified in known manner. The base fraction comprising acetic acid may be recycled.

C. Production of Vinyl Alcohol Polymers and Copolymers

The production of PVOH or copolymers of PVOH from vinyl acetate involves two steps. The first step is the polymerization of vinyl acetate to form polyvinyl acetate, and the second step involves alcoholysis of the polyvinyl acetate to form PVOH. The first step involves the conversion of vinyl acetate into repeating polymeric units. This conversion may be depicted schematically as follows:

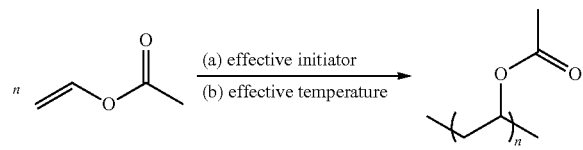

wherein n is an integer of from about 2500 to 25,000, preferably from about 9000 to about 23,000, and most preferably from about 11,000 to about 21,000. The first step of the process can be conveniently carried out by bulk polymerizing vinyl acetate in the presence of a suitable initiator to form the desired polyvinyl acetate. The polymerization process optionally occurs in the presence of a co-monomer such as ethylene to form a copolymer of ethylene/vinyl acetate. Exemplary processes for forming PVOH are described in U.S. Pat. Nos. 4,463,138; and 4,820,767, each of which is incorporated herein by reference in its entirety.

The initiator may be a free radical polymerization initiator that is capable of bulk polymerizing vinyl acetate at a temperature of from about 0° C. to about 40° C. to provide an essentially linear polyvinyl acetate having a weight average molecular weight equal to or greater than about 900,000, which on alcoholysis provides a PVOH having a weight average molecular weight equal to or greater than about 450,000. The weight average molecular weight is determined by the method described in W. S. Park, et al, Journal of Polymer Science, Polymer Physics Ed. vol. 15, p. 81 (1977). Usually, the effective initiator is an azo compound having a half life of up to about 200 hrs at a temperature of from about 0° C. to about 40° C. In a preferred embodiment of the invention, the initiator will have a half life of from about 1 to about 200 hours at a temperature of from about 0° C. to about 40° C., and in the particularly preferred embodiments of the invention, the initiator of choice will have a half life of from about 10 to about 150 hours at a temperature of from about 10° C. to about 35° C. In one aspect, the initiator has a half life of from about 50 to about 100 hours measured at a temperature of from about 15° C. to about 30° C. The half life of the initiator can be calculated from the decomposition rate of the initiator which is described in, for example, the "Polymer Handbook", J. Brandrup & E. H. Immergut, John Wiley & Sons. 1975. Illustrative of initiators suitable for use in the procedure of the invention are azo compounds of the formula:

$$R_1\text{---}N\text{=}N\text{---}R_2$$

wherein $R_1$ and $R_2$ are the same or different, and are independently straight or branched-chain lower alkyl, lower alkoxyalkyl, cycloalkyl, nitrile substituted alkyl groups, or phenylalkylnitrile. The selection of suitable $R_1$ and $R_2$ groups is well within the skill of the art. Within the scope of the above formula preferred azo initiator are 2,2'-azobis-(2,4-dimethyl-4-methoxyvaleronitrile); 2,2'-azobis-(2,4-dimethylvaleronitrile); 1,1'-azobis-1-cyclooctanenitrile; azobis-2-methylbutyronitrile; 1,1'-azobis-1-cyclohexanecarbonitrile; 2,2'-azobis-2-propylbutyronitrile; 2,2'-azobis-2-methylhexylonitrile; 2,2'-azobis-2-benzylpropionitrile and the like.

There is a relationship between the amount of initiator employed, the polymerization temperature and polymerization times. Each of the aforementioned process parameters may be selected, if desired, to maximize the molecular weight of the polyvinyl acetate, and, if desired, to minimize the degree of branching. In some exemplary embodiments, the initiator concentration may vary from about $1\times10^{-6}$ to about $1\times10^{-3}$ mole percent based on the total moles of vinyl acetate monomer, the polymerization temperature may range from about 0° C. to about 40° C., and polymerization times may vary from about 2 to about 48 hrs. In another aspect, initiator concentration will vary from about $1\times10^{-5}$ to about $1\times10^{-3}$ mole percent on the aforementioned basis, polymerization temperatures will vary from about 10° C. to about 35° C., and polymerization times will vary from about 4 to about 36 hrs. In another aspect, initiator concentration will vary from about $2\times10^{-5}$ to about $2\times10^{-4}$ mole percent on the aforementioned basis, polymerization temperatures will vary from 15° C. to about 25° C., and polymerization times will vary from about 6 to about 24 hrs. In yet another aspect, the initiator concentration will vary from about $5\times10^{-5}$ to about $5\times10^{-4}$ mole percent on the aforementioned basis, polymerization temperatures will vary from about 15° C. to about 25° C. and polymerization times will vary from about 6 to about 18 hrs.

The vinyl acetate monomer optionally has a purity equal to or greater than about 99% by weight and preferably equal to or greater than about 99.9% by weight. Small scale quantities of vinyl acetate having a purity equal to or greater than about 99.9% by weight may be obtained by fractionating vinyl acetate monomer with a 200-plate spinning band column and collecting the middle boiling fraction to about 72.2° C. Large quantities of vinyl acetate having a purity equal to or greater than 99.9% by weight for industrial production of high molecular weight PVOH may be obtained by standard industrial distillation procedures which are well known to those having skill in the art.

Polymerization of the vinyl acetate monomer is accomplished by initiated radical polymerization. Oxygen acts as an inhibitor of radical polymerization and, accordingly, the polymerization is preferably carried out under substantially oxygen free condition. Thus, the fractionated highly pure vinyl acetate monomer is preferably subjected to deoxygenation procedures prior to polymerization. This may be accomplished by a freeze-thaw operation under a high vacuum and an inert gas sweep wherein the monomer is frozen at about −93° C., thawed, refrozen, thawed, etc. The vinyl acetate monomer may be subjected to at least about three freeze-thaw cycles in order to ensure an essentially complete removal of oxygen. However, removal of oxygen by bubbling pure nitrogen through the polymerization mixture may also be also adequate.

Once a purified and deoxygenated vinyl acetate monomer is obtained, the monomer may then be transferred to a suitable reactor for conducting the free radical bulk polymerization process. Reactors suitable for use in the polymerizing reaction are not critical, and reactors used in conventional bulk polymerizations can be used. Suitable reactors will usually be equipped with a temperature control means to maintain the reaction mixture within the desired temperature range and should also be equipped with means to maintain the reactor substantially oxygen free; as for example, means for carrying out the polymerization under an inert gas such as nitrogen.

The polymerization process can be conducted in a batch, semicontinuous or continuous fashion. The reaction can be conducted in a single reaction zone or in a plurality of reaction zones, in series or in parallel or it may be conducted intermittently or continuously in an elongated tubular zone or series of such zones. The materials of construction employed should be inert to the reactants during the reaction and the fabrication of the equipment should be able to withstand the reaction temperatures and pressure.

The reaction zone can be fitted with one or more internal and/or external heat exchanger(s) in order to control undue temperature fluctuations, or to prevent any possible runaway reaction temperatures or fluctuations therein. In preferred embodiments of the process, agitation means to vary the degree of mixing of the reaction mixture can be employed. Mixing by vibration, shaking, stirring, rotation, oscillation, ultrasonic vibration or the like are all illustrative of the type of agitation means contemplated. Such means are available and well known to those skilled in the art.

The reactants and reagents may be initially introduced into the reaction zone batchwise or may be continuously or intermittently introduced in such zone during the course of the process. Means to introduce and/or adjust the quantity of reactants introduced, either intermittently or continuously into the reaction zone during the course of the reaction, can be conveniently utilized in the process especially to maintain the desired molar ratio of the reaction solvent, reactants and reagents.

Upon completion of the polymerization process, unreacted vinyl acetate may be removed by distillation under atmospheric or sub-atmospheric pressures. A polymeric residue comprising polyvinyl acetate will remain in the vessel utilized for the removal of unreacted vinyl acetate. The polyvinyl acetate product may be worked up by conventional means, as for example by initially dissolving the polymeric residue in an organic solvent such as acetone, tetrahydrofuran, methanol, dichloromethane, ethyl acetate, etc., and then precipitating the polymer with a non-solvent such as hexane, cyclohexanol, diethyl ether, mesitylene or the like. Similarly, precipitation of the polymers may be accomplished by simply employing cold water. Recovery of the polymer is then accomplished by standard filtration and drying procedures.

Polyvinyl acetate produced by the above process will have an intrinsic viscosity, and thus a corresponding molecular weight which is only slightly higher than reacetylated polyvinyl acetate produced from PVOH resulting from alcoholysis of the original polyvinyl acetate. Thus, the polyvinyl acetate that is produced may be essentially linear. Polyvinyl acetate produced in accordance with this process may have an intrinsic viscosity that is equal to or greater than about 3.2 dL/g. This corresponds to a weight average molecular weight of equal to or greater than about $1.0 \times 10^6$. Thus, given the fact that the repeat unit of polyvinyl acetate has a molecular weight of about 86 and the repeating unit of PVOH has a molecular weight of about 44, PVOH produced by the alcoholysis of such polyvinyl acetate has a weight average molecular weight of at least about $0.45 \times 10^6$. In a preferred embodiment of the invention, the polyvinyl acetate has an intrinsic viscosity ranging from about 3.5 dL/g to about 4.0 dL/g. Polyvinyl acetate falling within this intrinsic viscosity range has a weight average molecular weight ranging from about $1.3 \times 10^6$ to about $1.6 \times 10^6$, and PVOH prepared by the alcoholysis of this material will have a weight average molecular weight ranging from about $0.5 \times 10^6$ to about $0.8 \times 10^6$.

The determination of the weight average molecular weight of polyvinyl acetate may be accomplished by any one of a number of techniques known to those skilled in the art. Illustrative examples of suitable means for conducting the molecular weight determination include light scattering techniques which yield a weight average molecular weight and intrinsic viscosity determination which may be correlated to weight average molecular weight in accordance with the relationship $[\eta]=5.1 \times 10^{-5} M^{0.791}$ described more fully by W. S. Park, et al. in the Journal of Polymer Science, Polymer Physics Ed., vol. 15, p. 81 (1977).

The second step, converting polyvinyl acetate to PVOH, can be depicted schematically as follows:

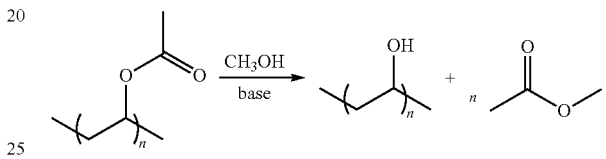

wherein n is as described above. Conventional procedures for the alcoholysis of polyvinyl acetate can be used to convert the polyvinyl acetate into PVOH. Illustrative of such procedures are those described in detail in U.S. Pat. No. 4,463,138 which is incorporated herein by reference. Briefly stated, the alcoholysis may be accomplished by initially dissolving the polyvinyl acetate in a quantity of a low molecular weight alcohol such as methanol sufficient to form at least about a 2% solution of the polyvinyl acetate resin. Base or acid catalysis may then be employed in order to convert the polyvinyl acetate to PVOH which is produced in the form of a gel. Base catalysis is preferred, however, with suitable bases including anhydrous potassium hydroxide, anhydrous sodium hydroxide, sodium methoxide, potassium methoxide, etc. The alcoholysis reaction may take place under anhydrous or substantially anhydrous conditions, for example, when sodium hydroxide is used as the base, to avoid unwanted formation of sodium acetate instead of the desired methyl acetate. The gel material is optionally chopped into small pieces and may be extracted repeatedly with methanol, ethanol or water for removal of residual base salts. The essentially pure PVOH may be dried under vacuum at a temperature of about 30° C. to about 70° C. for about 2 to 20 hours. PVOH produced in accordance with the process may have a weight average molecular weight of at least about $0.45 \times 10^6$. In a preferred embodiment, the weight average molecular weight of the PVOH is from about $0.45 \times 10^6$ to about $1.0 \times 10^6$, e.g., from about $0.5 \times 10^6$ to about $0.8 \times 10^6$.

PVOH produced in accordance with this invention may be useful in the production of PVOH fibers of excellent strength. Also, fibers produced from the PVOH of this invention preferably have high melting points.

The above-described alcoholysis reaction may be similarly employed in the formation of copolymers of polyvinyl alcohol, and in particular, in the alcoholysis of ethylene/vinyl acetate copolymer to form EVOH.

D. Methyl Acetate Stream

As shown above, for each molar equivalent of the repeating units of the polyvinyl acetate, the alcoholysis reaction forms one mole of methyl acetate byproduct. U.S. Pat. No. 7,906,680, the entirety of which is incorporated herein by reference, describes a process for coproducing polyvinyl alcohol or an alkene vinyl alcohol copolymer and acetic acid. In the process, the methyl acetate byproduct from the formation of the polyvinyl alcohol or an alkene vinyl alcohol copolymer is carbonylated to form acetic acid and/or acetic anhydride. In another process described in U.S. Pat. No. 7,906,680, the methyl acetate is converted to acetic acid by hydrolysis. The acetic acid is then sold or can be recycled to vinyl acetate production. The processes of the present invention advantageously involve directing the methyl acetate to a hydrogenolysis step, described below, to produce ethanol and methanol. The processes of the present invention thereby reduce or eliminate the need for hydrolysis equipment and concomitant energy requirements.

The methyl acetate stream that is derived from the polyvinyl alcohol or an alkene vinyl alcohol copolymer production process may contain various components that render the methyl acetate stream unsuitable or less suitable for being directly fed to the hydrogenolysis process. The methyl acetate stream may comprise, for example, methyl acetate, methanol (excess reactant in the above mentioned reaction), light organic impurities, sodium acetate, vinyl acetate monomer, and potentially polymer solids and water. Light organic impurities contained in the crude methyl acetate stream obtained in the conversion of vinyl acetate polymer or copolymer to vinyl alcohol polymer or copolymer may include, for example, carbonyl impurities such as acetic acid, acetaldehyde, acetone, methyl ethyl ketone, butyraldehyde, crotonaldehyde, 2-ethyl crotonaldehyde, and 2-ethyl butyraldehyde and the like, as well as unsaturated aldehydes. Additional impurities, which may be present in the methyl acetate stream, may include toluene, benzene, dimethylacetal, 3-methyl-2-pentanone, propionic acid, ethyl acetate and ethanol.

Depending on the amount and type of the various contaminants in the methyl acetate stream as well as the catalyst sensitivity in the hydrogenolysis step, it may be desired to remove some of the contaminants contained in the methyl acetate stream prior to sending the stream to the hydrogenolysis step. The presence of polymer solids in the methyl acetate stream, for example, may interfere or foul the hydrogenolysis reactor and are preferably removed from the methyl acetate stream before hydrogenolysis. In addition, the water content of the methyl acetate stream may be adjusted as part of purification of the methyl acetate stream prior to hydrogenolysis.

Methods to purify the crude methyl acetate stream include, but are not limited to, separation of water, impurities and solids via extractive distillation, liquid/liquid extraction, distillation, crystallization, gas stripping, a membrane separation technique, filtration, flash vaporization, and chemical reaction of one or more impurities. One way of using a chemical reaction to remove impurities from a methyl acetate stream is described in U.S. Patent Publication No. 2010/0204512, where the aldehyde content of a stream is reduced by contacting the stream with a catalyst comprising a Group VIII to XI metal, such as platinum or palladium. For example, impurities, such as of acetaldehyde and diethanolamine in a methyl acetate stream may be selectively oxidized in the presence of an oxidation catalyst, such as a palladium catalyst. Another way of using a chemical reaction to remove impurities from a methyl acetate stream is described in U.S. Pat. No. 5,206,434, where carbonyl impurities in a stream are reduced by adding an amino compound, such as hydroxylamine sulfate to the stream under conditions sufficient to react the amino compound with carbonyl impurities to form a water soluble nitrogenous derivative.

In the production of PVOH or copolymer thereof, the resultant methyl acetate formed may be considered to be a mother liquor to be ultimately purified and fed to a methyl acetate hydrogenolysis reactor for the production of ethanol and methanol. The crude methyl acetate stream may be directed to a mother liquor column for purification to remove impurities, such as light organic components, polymeric solids and water. The column may be operated at elevated pressure, and heated, to remove essentially all of the methyl acetate in an overhead stream in purified form, and over 95% of the methanol from the impure methyl acetate crude mixture. The reflux of the column may be adjusted to control the amount of water in the column overhead. The polymeric solids may comprise polyvinyl acetate, PVOH, and sodium acetate. These polymeric solids may exit from the bottom of the mother liquor column as a residue.

By operating the mother liquor column at an elevated pressure, the overhead components or overheads may be used as a heat source for other recovery columns in the PVOH plant. Operating at about 55 psig allows for over 50% of the energy used in this tower to be recovered. Other streams may additionally be sent to the mother liquor column for separation. For example, a stream containing water and methanol from the extractive distillation of vinyl acetate and methanol, which is often used in the PVOH process, may also be sent to the mother liquor column for separation.

Thus, an initial or crude methyl acetate stream from the polyvinyl alcohol polymer or copolymer production process may be recovered and refined to form a refined methyl acetate stream, which is more suitable for being fed to a methyl acetate hydrogenolysis process. The initial or crude methyl acetate stream is also referred to herein as a first methyl acetate stream, and the refined stream is also referred to herein as a second methyl acetate stream. The second stream contains less impurities, which could adversely affect the hydrogenolysis reaction.

Excess water and polymer solids may be removed while organic losses in the aqueous stream are kept to a low level. Other aqueous/organic streams which contain a subset of the above listed components may also be purified. The product of the purification step is a refined methyl acetate stream, also referred to herein as a second stream, generally containing methyl acetate, and an acceptable level of impurities such as methanol, essentially no polymer solids, and sufficiently low amounts of water. The refined methyl acetate stream may comprise, for example, methanol in an amount of 5 wt % to 95 wt %, for example, 5 wt % to 40 wt %, for example, 10 wt % to 30 wt % methanol, based on the total weight of methanol and methyl acetate in the refined methyl acetate stream. This refined methyl acetate stream may also comprise, for example, water in an amount of 0 wt % to 10 wt %, for example, 0 wt % to 7 wt %, for example, 0 wt % to 5 wt % water, based on the total weight of water and methyl acetate in the refined methyl acetate stream. The impurities or amounts thereof, including water concentration, can vary based on the desired application, hydrogenolysis catalyst employed and the equipment in use.

E. Hydrogenolysis

As discussed above, the processes of the invention involve a step of subjecting methyl acetate derived from a PVOH or PVOH copolymer (e.g., EVOH) to hydrogenolysis in a hydrogenolysis reactor to form methanol and ethanol. In this context, the term "hydrogenolysis" of methyl acetate refers to the reaction of methyl acetate with hydrogen to form methanol and ethanol, but it should be understood that this reaction is not limited to any particular mechanism and may occur via one or more intermediates, e.g., acetic acid, which may undergo further reaction, e.g., hydrogenation, to form one or more alcohol species, e.g., ethanol.

According to one optional embodiment, at least a portion of the methanol, which is coproduced with ethanol, is recycled to the methanolysis reaction, as a source of methanol for converting a vinyl acetate polymer or copolymer to a vinyl alcohol polymer or copolymer and methyl acetate. According to another optional embodiment, at least a portion of the methanol, which is coproduced with ethanol, is carbonylated to form acetic acid, which is, in turn, recycled to the process for producing vinyl acetate monomer, described above.

At least a portion of any methanol stream may be treated in one or more purification steps, for example, prior to being introduced into the reaction zone for synthesis of acetic acid or PVOH.

The hydrogenolysis step may include a variety of configurations using a fixed bed reactor or a fluidized bed reactor. In many embodiments of the present invention, an "adiabatic" reactor can be used; that is, there is little or no need for internal plumbing through the reaction zone to add or remove heat. In other embodiments, a radial flow reactor or reactors may be employed, or a series of reactors may be employed with or without heat exchange, quenching, or introduction of additional feed material. Alternatively, a shell and tube reactor, provided with a heat transfer medium, may be used. In many cases, the reaction zone may be housed in a single vessel or in a series of vessels with heat exchangers therebetween.

The catalyst may be employed in a fixed bed reactor, e.g., in the shape of a pipe or tube, where the reactants, typically in the vapor form, are passed over or through the catalyst. Other reactors, such as fluid or ebullient bed reactors, may be employed. In some instances, the hydrogenolysis catalysts may be used in conjunction with an inert material to regulate the pressure drop of the reactant stream through the catalyst bed and the contact time of the reactant compounds with the catalyst particles.

The hydrogenolysis reaction may be carried out in either the liquid phase or vapor phase. For example, the reaction may be carried out in the vapor phase under the following conditions. The reaction temperature may range from 75° C. to 350° C., e.g., from 125° C. to 350° C., e.g., from 150° C. to 325° C., from 150° C. to 300° C., or from 200° C. to 300° C. The pressure may range from 10 kPa to 10000 kPa, e.g., from 50 kPa to 5000 kPa, or from 100 kPa to 2500 kPa. The reactants may be fed to the reactor at a gas hourly space velocity (GHSV) of greater than 500 $hr^{-1}$, e.g., greater than 1000 $hr^{-1}$, greater than 2500 $hr^{-1}$ or even greater than 5000 $hr^{-1}$. In terms of ranges the GHSV may range from 50 $hr^{-1}$ to 50,000 $hr^{-1}$, e.g., from 500 $hr^{-1}$ to 30,000 $hr^{-1}$, from 1000 $hr^{-1}$ to 10,000 $hr^{-1}$, or from 1000 $hr^{-1}$ to 6500 $hr^{-1}$.

The hydrogenolysis step optionally is carried out at a pressure just sufficient to overcome the pressure drop across the catalytic bed at the GHSV selected, although there is no bar to the use of higher pressures, it being understood that considerable pressure drop through the reactor bed may be experienced at high space velocities, e.g., 5000 $hr^{-1}$ or 6,500 $hr^{-1}$.

In one embodiment, the molar ratio of hydrogen to methyl acetate that is introduced into the hydrogenolysis reaction zone is greater than 2:1, e.g. greater than 4:1, or greater than 12:1. In terms of ranges the molar ratio may be from 2:1 to 100:1, e.g., 4:1 to 50:1, or from 12:1 to 20:1. Without being bound by theory higher molar ratios of hydrogen to methyl acetate, preferably from 8:1 to 20:1, are believed to result in high conversion and/or selectivity to ethanol.

Contact or residence time may also vary widely, depending upon such variables as amount of methyl acetate, catalyst, reactor, temperature, and pressure. Typical contact times range from a fraction of a second to more than several hours when a catalyst system other than a fixed bed is used. Contact times, at least for vapor phase reactions, may be from 0.1 to 100 seconds, e.g., from 0.3 to 80 seconds or from 0.4 to 30 seconds.

The hydrogenolysis of methyl acetate to form methanol and ethanol is preferably conducted in the presence of a hydrogenolysis catalyst. Suitable hydrogenolysis catalysts include catalysts comprising a first metal and optionally one or more of a second metal, a third metal or any number of additional metals, optionally on a catalyst support. The first and optional second and third metals may be selected from Group IB, IIB, IIIB, IVB, VB, VIIB, VIIB, VIII transition metals, a lanthanide metal, an actinide metal or a metal selected from any of Groups IIIA, IVA, VA, and VIA.

Particular hydrogenolysis catalysts include copper containing catalysts. These copper containing catalysts may further comprise one or more additional metals, optionally, on a catalyst support. The optional additional metal or metals may be selected from Group IB, IIB, IIIB, IVB, VB, VIIB, VIIB, VIII transition metals, a lanthanide metal, an actinide metal or a metal selected from any of Groups IIIA, IVA, VA, and VIA. Particular metal combinations for some exemplary catalyst compositions include copper/cobalt/zinc, copper/zinc/iron, copper/cobalt/zinc/iron, copper/cobalt/zinc/iron/calcium, and copper/cobalt/zinc/molybdenum/sodium. Particular copper containing catalysts may comprise copper chromite, copper and zinc, and/or copper-zinc-oxide. Exemplary catalysts are further described in U.S. Pat. No. 5,198,592, U.S. Pat. No. 5,414,161, U.S. Pat. No. 7,947,746, U.S. Patent Publication No. 2009/0326080, and WO 83/03409, the entireties of which are incorporated herein by reference. Hydrogenolysis catalysts may comprise CuO or ZnO. However, CuO and ZnO may be reduced or partially reduced by hydrogen during the course of the hydrogenolysis reaction. It is also possible to pre-reduce CuO and/or ZnO by passing hydrogen over the catalyst before the introduction of the methyl acetate feed.

As indicated above, in some embodiments, the catalyst further comprises at least one additional metal, which may function as a promoter.

In addition to one or more metals, in some embodiments of the present invention the catalysts further comprise a support or a modified support. As used herein, the term "modified support" refers to a support that includes a support material and a support modifier, which adjusts the acidity of the support material.

In particular, the hydrogenolysis of methyl acetate may achieve favorable conversion of methyl acetate and favorable selectivity and productivity to methanol and ethanol. For purposes of the present invention, the term "conversion" refers to the amount of methyl acetate in the feed that is converted to a compound other than methyl acetate. Conversion is expressed as a mole percentage based on methyl acetate in the feed. The conversion may be at least 10%, e.g., at least 20%, at least 40%, at least 50%, at least 60%, at least 70% or at least 80%. Although catalysts that have high conversions are desirable, such as at least 80% or at least 90%, in some embodiments a low conversion may be acceptable at high selectivity for methanol/ethanol. It is, of course, well understood that in many cases, it is possible to compensate for conversion by appropriate recycle streams or use of larger reactors, but it is more difficult to compensate for poor selectivity.

Selectivity is expressed as a mole percent based on converted methyl acetate. It should be understood that each compound converted from methyl acetate has an independent selectivity and that selectivity is independent from conversion. For example, if 60 mole % of the converted methyl acetate is converted to ethanol, we refer to the ethanol selectivity as 60%. The catalyst selectivity to each of methanol and ethanol may be, for example, at least 60%, e.g., at least 70%, or at least 80%. For example, the selectivity to methanol and/or ethanol may be at least 80%, e.g., at least 85% or at least 88%. Preferred embodiments of the hydrogenolysis process also have low selectivity to undesirable products, such as methane, ethane, and carbon dioxide. The selectivity to these undesirable products preferably is less than 4%, e.g., less than 2% or less than 1%. More preferably, these undesirable products are present in undetectable amounts. Formation of alkanes may be low, and ideally less than 2%, less than 1%, or less than 0.5% of the methyl acetate passed over the catalyst is converted to alkanes, which have little value other than as fuel.

The term "productivity," as used herein, refers to the grams of a specified product, e.g., ethanol, formed during the hydrogenolysis based on the kilograms of catalyst used per hour. A productivity of at least 100 grams of ethanol per kilogram of catalyst per hour, e.g., at least 400 grams of ethanol per kilogram of catalyst per hour or at least 600 grams of ethanol per kilogram of catalyst per hour, is possible. In terms of ranges, the productivity may be from 100 to 3,000 grams of ethanol per kilogram of catalyst per hour, e.g., from 400 to 2,500 grams of ethanol per kilogram of catalyst per hour or from 600 to 2,000 grams of ethanol per kilogram of catalyst per hour.

In various embodiments of the present invention, the crude alcohol product produced by the hydrogenolysis process, before any subsequent processing, such as purification and separation, will typically comprise methanol, ethanol and, possibly, water. The product stream from the hydrogenolysis reaction zone may also comprise unconverted methyl acetate. This unconverted methyl acetate may be separated from methanol and ethanol and saponified, for example, at room temperature with caustic on a stoichiometric basis. When aqueous sodium hydroxide is used as the caustic, the saponification product will comprise sodium acetate in aqueous solution. Caustic may be recovered, for example, by using a bipolar membrane. Sodium acetate may be converted to acetic acid by adjustment of pH. Caustic may be recycled to the saponification reaction zone. Acetic acid may be recycled to a reaction zone for converting acetic acid into vinyl acetate.

The ethanol product produced by the process of the present invention may be an industrial grade ethanol comprising from 75 to 96 wt. % ethanol, e.g., from 80 to 96 wt. % or from 85 to 96 wt. % ethanol, based on the total weight of the ethanol product.

The finished ethanol composition of the present invention preferably contains very low amounts, e.g., less than 0.5 wt. %, of other alcohols, such as methanol, butanol, isobutanol, isoamyl alcohol and other $C_4$-$C_{20}$ alcohols. In one embodiment, the amount of isopropanol in the finished ethanol composition is from 80 to 1,000 wppm, e.g., from 95 to 1,000 wppm, from 100 to 700 wppm, or from 150 to 500 wppm. In one embodiment, the finished ethanol composition is substantially free of acetaldehyde, optionally comprising less than 8 wppm acetaldehyde, e.g., less than 5 wppm or less than 1 wppm.

E. Dehydration of Ethanol

The dehydration of ethanol to ethylene converts one mole of ethanol ($C_2H_5OH$) into one mole of ethylene ($C_2H_4$) and one mole of water ($H_2O$).

Any of known dehydration catalysts may be employed in to dehydrate ethanol, such as those described in U.S. Patent Publication No. 2010/0030002, U.S. Patent Publication No. 2010/0030001, U.S. Pat. No. 4,727,214, and U.S. Pat. No. 4,134,926, the entire contents and disclosures of which are hereby incorporated by reference. A zeolite catalyst, for example, may be employed as the dehydration catalyst. While any zeolite having a pore diameter of at least about 0.6 nm can be used, preferred zeolites include dehydration catalysts selected from the group consisting of mordenites, ZSM-5, a zeolite X and a zeolite Y. Zeolite X is described, for example, in U.S. Pat. No. 2,882,244 and zeolite Y in U.S. Pat. No. 3,130,007, the entireties of which are hereby incorporated by reference.

F. Methanol, Carbon Monoxide and Hydrogen from Syngas

As petroleum and natural gas prices fluctuate becoming either more or less expensive, methods for producing acetic acid and intermediates such as methanol and carbon monoxide from alternate carbon sources have drawn increasing interest. In particular, when petroleum is relatively expensive, it may become advantageous to produce acetic acid from synthesis gas ("syngas") that is derived from more available carbon sources. U.S. Pat. No. 6,232,352, the entirety of which is incorporated herein by reference, for example, teaches a method of retrofitting a methanol plant for the manufacture of acetic acid. By retrofitting a methanol plant, the large capital costs associated with CO generation for a new acetic acid plant are significantly reduced or largely eliminated. All or part of the syngas is diverted from the methanol synthesis loop and supplied to a separator unit to recover CO, which is then used to produce acetic acid. In a similar manner, hydrogen for the hydrogenolysis step may be supplied from syngas.

In some embodiments, some or all of the raw materials may be derived partially or entirely from syngas. For example, the acetic acid may be formed from methanol and carbon monoxide, both of which may be derived from syngas. The syngas may be formed by partial oxidation reforming or steam reforming, and the carbon monoxide may be separated from syngas. Similarly, hydrogen that is used in the step of hydrogenolysis of methyl acetate to form the crude reaction mixture may be separated from syngas. The syngas, in turn, may be derived from variety of carbon sources. The carbon source, for example, may be selected from the group consisting of natural gas, oil, petroleum, coal, biomass, and combinations thereof. Syngas or hydrogen may also be obtained from bio-derived methane gas, such as bio-derived methane gas produced by landfills or agricultural waste.

Example 1

A distillation was conducted using streams from a PVOH process. In the laboratory, a 40 tray Oldershaw column was employed. A mother liquor stream containing 0.24 wt % solids was fed about midway on the column, while an aqueous methanol stream containing 0.13 wt % solids was fed to the column about one third from the base. In the atmospheric distillation the overhead and the base temperatures were 68° C. and 100° C., respectively. The mother liquor feed rate was 13.7 g/min and the aqueous methanol feed rate was 11.5 g/min. The reflux ratio was maintained at about 0.23. No foaming or major fouling problems in the reboiler were observed during the distillation. Dark brown/black staining or fouling was observed from around tray 15 to the base. However, this minor fouling did not plug the small tray holes or downcomers of the Oldershaw column. The trays above the mother liquor feed were clean.

The analysis of the feed, overhead methanol/methyl acetate product, and the wastewater residue is given in Table 1 below.

TABLE 1

Analysis Of Laboratory Experiment On Distillation Of Feed/Methyl Acetate Mixture

| Component | Mother Liquor Feed | Aqueous Methanol Feed | Product | Residue |
|---|---|---|---|---|
| Water (wt %) | 21.4 | 82.5 | 5.3 | 100 |
| Methanol (wt %) | 55.3 | 17.5 | 66.8 | 0.0656 |
| Methyl Acetate (wt %) | 27.1 | Nd | 27.9 | Nd |
| Ethanol (ppm) | 1476 | 75 | 1704 | Nd |
| Acetone (ppm) | Nd | Nd | Nd | 16 |
| Dimethyl Acetal (ppm) | 17 | Nd | 22 | Nd |
| Ethyl Acetate (ppm) | 315 | Nd | 366 | Nd |
| Acetaldehyde (ppm) | 248 | Nd | 313 | Nd |
| Toluene (ppm) | Nd | Nd | 74 | Nd |
| Acetic Acid (ppm) | 45 | Nd | Nd | 87 |
| Alkanes (ppm) | <100 | 781 | 3 | 932 |

Nd = non-detected, values are not normalized.
Product = Methyl Acetate, Methanol Product of Invention.

This Example illustrates that a methanol/methyl acetate stream could be purified at a low reflux ratio with less than 1000 ppm methanol and less than 2600 ppm alkanes in the waste water.

Example 2

Prophetic

This Example describes hydrogenolysis of methyl acetate as reported in paragraph [0064] of U.S. Patent Publication No. 2009/0326080. Methyl acetate is produced as hereinabove described, and maintained as a liquid at 20° C., is pumped at a pressure from 10 to 50 atm, through a heat exchanger that vaporizes it completely at a temperature from 150° C. to 225° C. Preheated hydrogen at the same temperature range is added to the vapors as they exit from the heat exchanger. The molar ratio $H_2$ to methyl acetate is from 5 to 10. The hot mixture is blown through a catalytic bed including a CuO/copper chromite, a $CuO/ZnO/Al_2O_3$, or a CuO/ZnO/ activated carbon catalyst and an inert solid which acts as a diluent of the catalyst. The CuO is reduced to Cu by adding a mixture of $H_2$ and $N_2$ prior to adding any acetate. The CuO is thus reduced to Cu, the active form in the hydrogenolysis reaction. The reduction is carried out until no water is produced. The exothermicity of the reduction of the CuO is controlled by keeping the $H_2$ concentration in the gas mixture at levels not exceeding 5 vol. %. For the hydrogenolysis, the liquid hourly space velocities (LHSV) are from 1 to 10 $h^{-1}$ relative to the methyl acetate flow rates and to the true volume occupied by the catalyst (with no inert solid present). Temperature of the reactor is maintained from 225° C. to 275° C. The conversion of 1 mole of methyl acetate into 0.90 mole of methanol and 0.90 mole of ethanol is carried out within the above mentioned operating parameters. The unconverted methyl acetate, 0.10 mole, is separated from the methanol and ethanol products, and is recycled to the hydrogenolysis reaction.

Example 3

This Example also describes hydrogenolysis of methyl acetate. Six experiments were conducted in a Rotoberty® continuous stirred-tank reactor (CSTR). The same charge of 40 mL of a copper-zinc oxide on alumina catalyst, i.e. MegaMax 700® (Süd Chemie), was used for all six experiments. The first four experiments were performed at ~360-375 psig, and the last two were at a higher pressure of 625 psig. At 360 psig, two reactions were tested at 250° C. followed by two at 275° C.; one temperature of 250° C. was tested at 625 psig. For all six experiments, the methyl acetate LHSV alternated between 0.85 $hr^{-1}$ and 1.25 $hr^{-1}$, and the $H_2$ to methyl acetate ratio was kept constant at approximately 14:1 $H_2$ to methyl acetate mole ratio.

The reaction conditions and results for the six methyl acetate experiments are provided in Table 2. A summary of the product composition for experiment 2 is provided in Table 3.

In Table 2, calculations are made for methyl acetate conversion, selectivity to methanol, selectivity to ethanol and productivity to ethanol.

Methyl acetate conversion is calculated as $(X_1$ minus $Y_1)*100 \div X_1$, where $X_1$ is the number of moles of methyl acetate (MeOAc) in the feed, and where $Y_1$ is the number of moles of methyl acetate in the product. Methyl acetate conversion is also referred to herein as $X_{meOAc}$.

Selectivity to methanol is calculated as $X_2*100*2*Y_2$, where $X_2$ is the molality of methanol in the liquid product (i.e. moles of methanol per kg of sample), and where $Y_2$ is the molality of the total major liquid products. Such total major products include ethanol, methanol, ethyl acetate, butanols, $C_3$ ketone and alcohols, and heavy ends (MW≥116). The molality of methanol in the liquid product is multiplied by 2 in order to reflect that one mole of methyl acetate breaks into two components on the surface of the catalyst, and only half of the original molecule (the —$CH_3O$ group) reacts to form methanol. Selectivity to methanol is also referred to herein as $S_{MeOH}$.

Selectivity to ethanol and ethyl acetate is calculated as $[(X_3*2)+Y_3]*100 \div Y_2$, where $X_3$ is the molality of ethanol, where $Y_3$ is the molality of ethyl acetate, and where $Y_2$ is the molality of the total major liquid products. This value represents both free and esterified ethanol. Selectivity to ethanol and ethyl acetate is also referred to herein as $S_{EtOH+EtOAc}$.

Productivity to ethanol represents the grams of ethanol produced per kilogram of catalyst per hour. Productivity to ethanol is calculated as $(X_4$ minus $Y_4) \div Z_4$, where $X_4$ is grams of ethanol in the product per hour, where $Y_4$ is grams of ethanol in the feed per hour, and where $Z_4$ is kg of catalyst.

TABLE 2

Methyl Acetate Reaction Conditions and Key Results

| | Experiment No. | | | | | | |
|---|---|---|---|---|---|---|---|
| | 1 | 2 | 3 | 4 | 5 | 6 | Average |
| Catalyst volume (ml) | 40 | 40 | 40 | 40 | 40 | 40 | |
| Catalyst charge (g) | 38.72 | 38.72 | 38.72 | 38.72 | 38.72 | 38.72 | |

TABLE 2-continued

Methyl Acetate Reaction Conditions and Key Results

| | Experiment No. | | | | | | |
|---|---|---|---|---|---|---|---|
| | 1 | 2 | 3 | 4 | 5 | 6 | Average |
| LHSV ($hr^{-1}$) | 0.85 | 1.27 | 0.88 | 1.29 | 0.82 | 1.24 | |
| MeOAc feed rate (ml/mm) | 0.57 | 0.84 | 0.59 | 0.86 | 0.55 | 0.82 | |
| $H_2$/MeOAc mole ratio | 13.9 | 14.1 | 13.5 | 13.8 | 14.4 | 14.4 | |
| $H_2$ feed rate (sccm) | 2232 | 3348 | 2232 | 3348 | 2232 | 3348 | |
| Reactor Pressure (psig) | 377 | 365 | 374 | 378 | 625 | 630 | |
| Reactor Temperature (° C.) | 249 | 250 | 274 | 274 | 251 | 251 | |
| $N_2$ sparge rate (sccm) | 100.06 | 100.06 | 100.06 | 100.06 | 100.06 | 100.06 | |
| GHSV ($hr^{-1}$) | 3739.2 | 5528.7 | 3746.0 | 5534.5 | 3730.5 | 5520.1 | |
| Residence time (sec) | 13.4 | 8.8 | 12.7 | 8.7 | 21.9 | 14.9 | |
| Motor speed (rpm) | 2020.0 | 2020.0 | 2003.0 | 2003.0 | 2003.0 | 2003.0 | |
| CondenserTemp (° C.) | 3.0 | 3.0 | 3.0 | 3.0 | 3.0 | 3.0 | |
| SampleTime (hr) | 2 | 2 | 2 | 2 | 2 | 2 | |
| Key Results | | | | | | | |
| Methyl Acetate Conversion (%) | 90.29 | 82.43 | 90.90 | 86.10 | 88.78 | 83.77 | 87.04 |
| Ethanol Selectivity (mol %)° | 81.05 | 78.55 | 67.26 | 71.12 | 75.07 | 71.59 | 74.11 |
| Methanol Selectivity (mol %) | 82.64 | 102.51 | 68.01 | 80.21 | 91.61 | 93.73 | 86.45 |
| Ethanol + Ethyl Acetate Selectivity (mol %) | 85.29 | 84.68 | 70.74 | 76.02 | 78.94 | 77.09 | 78.79 |
| EtOH Productivity, g EtOH/kg catalyst/hr | 373 | 489 | 321 | 471 | 328 | 442 | 403.9 |
| EtOH Productivity, g EtOH/L catalyst/hr | 361 | 473 | 311 | 456 | 17 | 428 | 391.0 |

TABLE 3

Methyl Acetate Product Composition For Experiment 2.

| Total Output | grams | wt % | gmole |
|---|---|---|---|
| Hydrogen | 34.208 | 23.155 | 17.1039 |
| Oxygen | 0.000 | 0.000 | 0.0000 |
| Nitrogen | 19.794 | 13.398 | 0.7069 |
| Methane | 0.000 | 0.000 | 0.0000 |
| CO | 1.059 | 0.717 | 0.0353 |
| $Co_2$ | 0.000 | 0.000 | 0.0000 |
| Ethane | 0.318 | 0.215 | 0.0106 |
| Water (gas + liq) | 0.188 | 0.127 | 0.0105 |
| Acetaldehyde (gas + liq) | 0.263 | 0.178 | 0.0060 |
| Diethyl ether | 0.000 | 0.000 | 0.000 |
| Methanol (gas + liq) | 33.267 | 22.518 | 1.0383 |
| Ethanol (gas + liq) | 36.597 | 24.772 | 0.7956 |
| Acetone | 0.074 | 0.050 | 0.0013 |
| Methyl Acetate (gas + liq) ( . . . IPA) | 15.997 | 10.828 | 0.2159 |
| Unknown ($C_3$) | 0.026 | 0.018 | 0.0003 |
| n-Propanol | 0.058 | 0.039 | 0.0007 |
| Ethyl Acetate (gas + liq) | 5.468 | 3.701 | 0.0621 |
| 2-Butanone | 0.012 | 0.008 | 0.0002 |
| 2-Butanol (gas + liq) | 0.222 | 0.150 | 0.0030 |
| Acetic Acid | 0.000 | 0.000 | 0.0000 |
| 1-Butanol (gas + liq) | 0.052 | 0.035 | 0.0007 |
| Diethyl acetal | 0.000 | 0.000 | 0.0000 |
| Heavies | 0.132 | 0.089 | 0.0013 |
| Total Mass Out | 147.734 | 100.00 | 19.99 |

Example 4

Prophetic

Ethylene, acetic acid and oxygen are converted to VAM. The catalyst utilized is K, Pd, Au/$TiO_2$ prepared in accordance with the procedure of Example F of U.S. Pat. No. 7,855,303. The procedure as set forth in U.S. Pat. No. 6,852,877 to Zeyss et al. is used to react acetic acid, ethylene and oxygen. Typical reaction conditions include a temperature of 155° C. to 170° C. and a pressure of 9 bar. Vinyl acetate monomer is produced as a product.

Example 5

Prophetic

Ethanol is converted to ethylene in the manner described in the Example of U.S. Pat. No. 4,134,926. Vaporized ethanol is introduced into a jacketed fluidized bed reactor at a temperature of 750° F., with the fluidized bed of silica-alumina cracking catalyst being maintained at a temperature of 750° F. by circulating molten salt through the jacket of the reactor. The ethanol is introduced at a log-mean average superficial velocity of 0.74 feet per second. The residence time of the reaction is 2.7 seconds and the reactor pressure is 9.6 psig. The run is conducted at steady state for 123 minutes. As reported in U.S. Pat. No. 4,134,926, the ethanol conversion is 99.6%, the percent selectivity to ethylene is 99.9% and the percent yield of ethylene is 99.5%. As further reported in U.S. Pat. No. 4,134,926, the reactor effluent has the following composition: water, 50.02%; ethylene, 49.75%; acetaldehyde, 0.04%; ethanol, 0.19%, all mole percent.

While the invention has been described in detail, modifications within the spirit and scope of the invention will be readily apparent to those of skill in the art. In addition, it should be understood that aspects of the invention and portions of various embodiments and various features recited herein and/or in the appended claims may be combined or interchanged either in whole or in part. In the foregoing descriptions of the various embodiments, those embodiments which refer to another embodiment may be appropriately combined with one or more other embodiments, as will be appreciated by one of skill in the art. Furthermore, those of ordinary skill in the art will appreciate that the foregoing description is by way of example only, and is not intended to limit the invention.

I claim:

1. A process for producing a polymer or copolymer of vinyl alcohol,
the process comprising the steps of:
(a) contacting acetic acid with ethylene and oxygen under conditions sufficient to form vinyl acetate monomer;
(b) polymerizing at least a portion of the vinyl acetate monomer from step (a) to form a vinyl acetate based polymer or copolymer;
(c) contacting at least a portion of the vinyl acetate based polymer or copolymer from step (b) with a base and methanol under conditions effective to form a polymer or copolymer of vinyl alcohol and a first stream comprising methyl acetate;
(d) subjecting at least a portion of the methyl acetate to hydrogenolysis to form methanol and ethanol;
(e) dehydrating at least a portion of the ethanol formed in step (d) to form ethylene;
(f) recycling at least a portion of the ethylene formed in step (e) to step (a) for contact with acetic acid and oxygen;
(g) converting a carbon source into syngas, separating a portion of the syngas into a hydrogen stream and carbon monoxide stream, and using at least a portion of the hydrogen stream as a source of hydrogen in hydrogenolysis step (d); and
(h) converting at least some of the syngas into methanol, reacting a portion of the carbon monoxide stream with a portion of the methanol to form acetic acid, and using at least some of the acetic acid as a source of acetic acid in the step(a) reaction of acetic acid, ethylene and oxygen.

2. The process of claim 1, wherein the vinyl acetate based polymer or copolymer comprises polyvinyl acetate, and the polymer or copolymer of vinyl alcohol comprises polyvinyl alcohol.

3. The process of claim 1, wherein the vinyl acetate based polymer or copolymer comprises an alkene vinyl acetate copolymer, and the polymer or copolymer of vinyl alcohol comprises an alkene vinyl alcohol copolymer.

4. The process of claim 1, further comprising the step of purifying the first stream comprising methyl acetate from step (a) to form a second stream comprising methyl acetate.

5. The process of claim 4, wherein the purifying step takes place by one or more of the following techniques: extractive distillation, liquid/liquid extraction, distillation, crystallization, gas stripping, a membrane separation technique, filtration, flash vaporization, and chemical reaction of one or more impurities.

6. The process of claim 4, wherein the first stream comprises methyl acetate, methanol, light organics and water.

7. The process of claim 4, wherein the second stream comprises methyl acetate and methanol.

8. The process of claim 4, wherein the second stream comprises from 5 wt % to 95 wt % methyl acetate and from 5 wt % to 95 wt % methanol, based on the total weight of methyl acetate and methanol in the second stream.

9. The process of claim 4, wherein the second stream comprises from 60 wt % to 95 wt % methyl acetate and from 5 wt % to 40 wt % methanol, based on the total weight of methyl acetate and methanol in the second stream.

10. The process of claim 4, wherein the second stream comprises from 70 wt % to 90 wt % methyl acetate and from 10 wt % to 30 wt % methanol, based on the total weight of methyl acetate and methanol in the second stream.

11. The process of claim 4, wherein the second stream comprises from 90 wt % to 100 wt % methyl acetate and from 0 wt % to 10 wt % water, based on the total weight of methyl acetate and water in the second stream.

12. The process of claim 4, wherein the second stream comprises from 93 wt % to 100 wt % methyl acetate and from 0 wt % to 7 wt % water, based on the total weight of methyl acetate and water in the second stream.

13. The process of claim 4, wherein the second stream comprises from 95 wt % to 100 wt % methyl acetate and from 0 wt % to 5 wt % water, based on the total weight of methyl acetate and water in the second stream.

14. The process of claim 1, wherein the hydrogenolysis step (d) occurs in the presence of a catalyst.

15. The process of claim 14, wherein the catalyst is a copper containing catalyst.

16. The process of claim 1, wherein the hydrogenolysis step (d) forms a mixed alcohol stream comprising methanol and ethanol, the process further comprising the step of separating the mixed alcohol stream into a methanol stream and an ethanol stream.

17. The process of claim 16, wherein the ethanol stream comprises at least 90 wt. % ethanol.

18. The process of claim 16, wherein the methanol stream comprises at least 90 wt. % methanol.

19. The process of claim 1, wherein a portion of the methanol formed in step (d) is recycled to step (c) for contact with the vinyl acetate based polymer or copolymer.

* * * * *